US007444239B2

(12) United States Patent
Park

(10) Patent No.: US 7,444,239 B2
(45) Date of Patent: Oct. 28, 2008

(54) TELEMATICS TERMINAL AND METHOD FOR TRANSMITTING ROUTE GUIDANCE INFORMATION DATA FITTED TO A RECEIVING TERMINAL

(75) Inventor: Sang-Ho Park, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 668 days.

(21) Appl. No.: 10/999,767

(22) Filed: Nov. 30, 2004

(65) Prior Publication Data

US 2005/0143912 A1 Jun. 30, 2005

(30) Foreign Application Priority Data

Dec. 31, 2003 (KR) ..................... 10-2003-0101719

(51) Int. Cl.
*G01C 21/30* (2006.01)

(52) U.S. Cl. ......................... 701/209; 701/25; 701/300; 340/995.12

(58) Field of Classification Search ................... 701/25, 701/207–209, 212, 214, 300; 340/988, 990, 340/995.12, 995.17
See application file for complete search history.

(56) References Cited

U.S. PATENT DOCUMENTS

| | | | |
|---|---|---|---|
| 5,699,255 | A | 12/1997 | Ellis et al. |
| 6,397,145 | B1 | 5/2002 | Millington |
| 2002/0040271 | A1 | 4/2002 | Park et al. |
| 2003/0164779 | A1 | 9/2003 | Gieseke et al. |

FOREIGN PATENT DOCUMENTS

| | | |
|---|---|---|
| EP | 1 035 531 | 4/2006 |

*Primary Examiner*—Gertrude Arthur Jeangla
(74) *Attorney, Agent, or Firm*—The Farrell Law Firm, PC

(57) ABSTRACT

Disclosed are a telematics terminal and a method for transmitting route guidance information data fitted to a receiving terminal. The method includes the steps of initializing operational conditions of a mobile communication terminal by transmitting device information of the telematics terminal to the mobile communication terminal when a connection between the telematics terminal and the mobile communication terminal is detected, receiving display performance information from the mobile communication terminal, creating route guidance data to be transferred to the mobile communication terminal for telematics services, selecting a route guidance region to be transferred to the mobile communication terminal from route guidance data based on the display performance information of the mobile communication terminal and reconstructing route guidance data for the selected route guidance region, and transmitting the reconstructed route guidance data to the mobile communication terminal. Thus, it is possible for the users to use telematics services without exchanging the mobile communication terminals.

10 Claims, 12 Drawing Sheets

TELEMATICS TERMINAL AND METHOD FOR TRANSMITTING ROUTE GUIDANCE INFORMATION DATA FITTED TO A RECEIVING TERMINAL

PRIORITY

This application claims priority to an application entitled "Telematics Terminal And Method For Transmitting Route Guidance Information Data Fitted To Receiving Terminal" filed in the Korean Intellectual Property Office on Dec. 31, 2003 and assigned Ser. No. 2003-101719, the contents of which are hereby incorporated by reference.

BACKGROUND OF THE INVENTION

1. Field of the Invention

The present invention relates to a telematics system, and more particularly to a telematics terminal and a method for transmitting route guidance data to a receiving terminal.

2. Description of the Related Art

Telematics is a compound word derived from the words "telecommunication" and "informatics". Telematics is a technique for transmitting mobile communication services and position tracking services to a vehicle so as to provide a driver in real time with various application services, such as information about vehicle accidents, vehicle burglary, driving route guidance, traffic and wildlife, and games.

Such a telematics system usually provides various application services to a driver while he/she is driving, therefore the telematics system includes a predetermined terminal, called a "telematics terminal", installed in a vehicle or carried by the driver.

The telematics terminal may include a communication function for communicating with a telematics server or may operate in relation to mobile communication terminals, such as portable phones. Generally, telematics terminals do not have display devices, so they may provide image information, for example, a route guidance image, by utilizing a display device, for example, a liquid crystal display (LCD), of a mobile communication terminal.

Currently, as new high-quality hardware has been introduced in portable phones, a universal serial bus (USB) capable of transmitting mass storage data is provided for the portable phone. Thus, various telematics terminals utilizing such USB capable portable phones have been developed. That is, telematics terminals have been developed that are capable of transmitting/receiving images to/from mobile communication terminals by using the USB.

The mobile communication terminals have various kinds of hardware specifications. In addition, various applications for the mobile communication terminals have been developed and widely used. Accordingly, display performance of the mobile communication terminals may vary depending on the types of hardware specifications and applications of the mobile communication terminals.

However, conventional telematics terminals cannot recognize the display performance of the mobile communication terminals, and therefore create and transmit route guidance data without considering the display performance, for example, a size of an LCD and resolution, of the mobile communication terminal. That is, telematics terminals store map data in flash memory that includes vector data of predetermined rectangular area units and image data, creates route guidance data based on such map data, and transmits the route guidance data to a mobile communication terminal without considering the display performance of the mobile communication terminal.

Accordingly, when the mobile communication terminal displays the route guidance data, an error often occurs due to a mismatch between the route guidance data and the display performance of the mobile communication terminal. For instance, the mobile communication terminal may display only a part of an image because the telematics terminal transmits the route guidance data including images having large sizes and vector data to the mobile communication terminal. In addition, it takes a long time for the mobile communication terminal to display the images and vector data because the telematics terminal transmits the route guidance data including mass storage image data to the mobile communication terminal.

SUMMARY OF THE INVENTION

Accordingly, the present invention has been made to solve the above-mentioned problems occurring in the prior art, and a first object of the present invention is to provide a telematics terminal and a method for transmitting route guidance data adaptable for various mobile communication terminals.

A second object of the present invention is to provide a telematics terminal and a method for transmitting route guidance data corresponding to performance of a mobile communication terminal.

To accomplish the above objects, there is provided a method for transmitting route guidance data from a telematics terminal including image data and vector data to a receiving terminal, the method including: initializing operational conditions of a mobile communication terminal by transmitting device information of the telematics terminal to the mobile communication terminal when a connection between the telematics terminal and the mobile communication terminal is detected; receiving display performance information from the mobile communication terminal; creating route guidance data to be transferred to the mobile communication terminal for telematics services; selecting a route guidance region to be transferred to the mobile communication terminal from the created route guidance data based on the received display performance information of the mobile communication terminal and reconstructing route guidance data for the selected route guidance region; and transmitting the reconstructed route guidance data to the mobile communication terminal.

To accomplish the above objects, according to another aspect of the present invention, there is provided a telematics terminal which includes a digital map storing section for storing map data therein; a present position detecting section for detecting and outputting a present position of a vehicle; a control section for calculating an optimum route in response a route guidance request and creating route guidance data including images and vector data for the optimum route; a route guidance data management section for receiving and storing display information of a mobile communication terminal, to which the route guidance data are transmitted, and reconstructing the route guidance data created in the control section such that the route guidance data are corresponding to the display information of the mobile communication terminal; and an interface section for transmitting optimized route guidance data from the route guidance data management section to the mobile communication terminal through a universal serial bus interface.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENT

Figure 1:
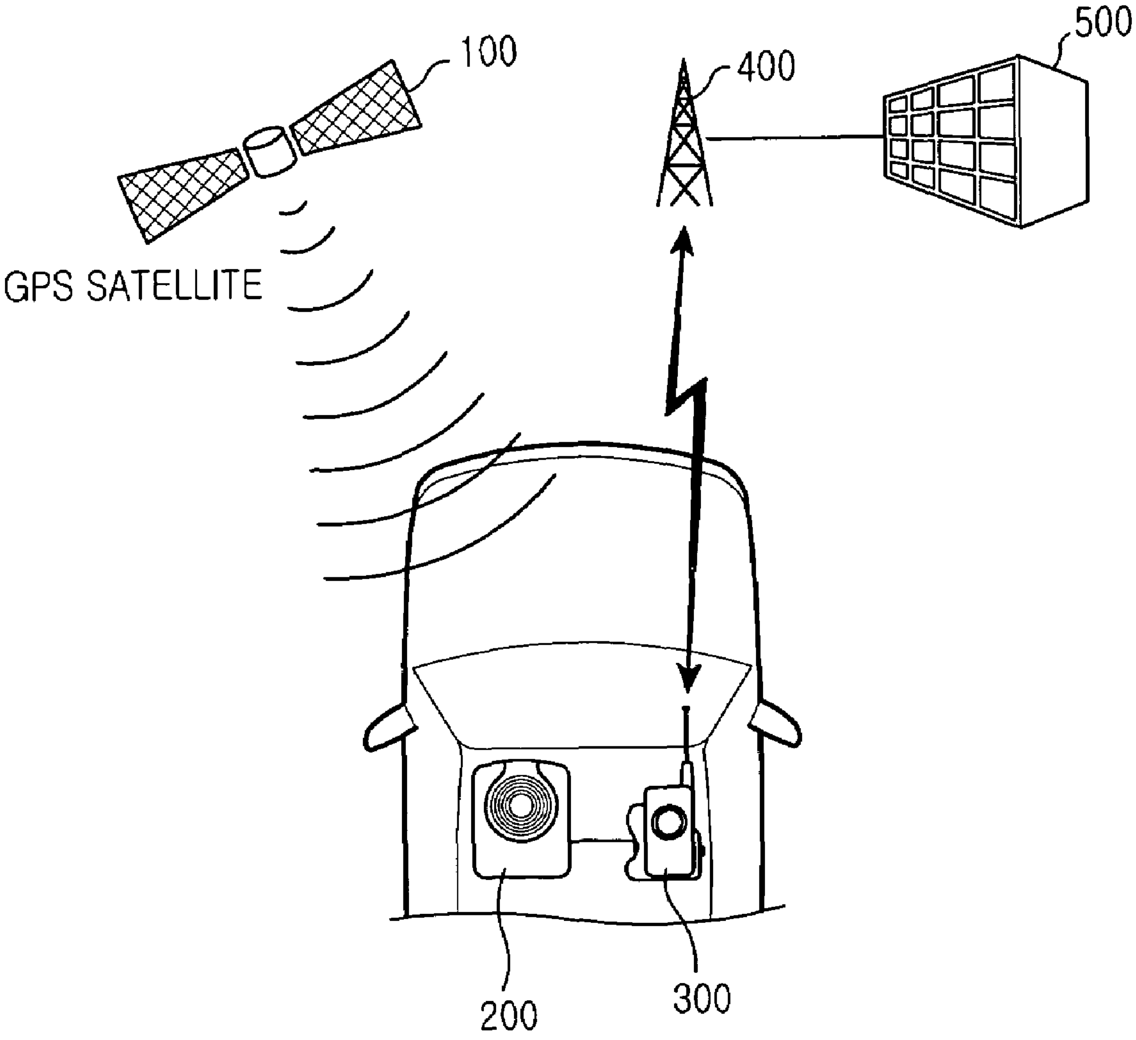
FIG.1 (PRIOR ART)
FIG. 1 is a diagram of a structure of a general telematics.

Hereinafter, a preferred embodiment of the present invention will be described with reference to the accompanying drawings. In the following description of the present invention, the same reference numerals are used to designate the same or similar components and a detailed description of known functions and configurations incorporated herein will be omitted when it may make the subject matter of the present invention unclear.

FIG. 1 is a view showing a structure of a general telematics system. Referring to FIG. 1, the telematics system includes a GPS satellite 100, a mobile communication terminal 300, which is called a "portable terminal" and communicates with a wireless network 400, a telematics terminal 200 communicating with both the GPS satellite 100 and the mobile communication terminal 300 to provide a driver with present position information and traveling information of a moving object, and an information center 500 connected to the wireless network 400 in order to provide various route guidance information to the telematics terminal 200. In FIG. 1, the telematics terminal 200 and the mobile communication terminal 300 are installed in a vehicle.

The telematics terminal 200 receives position information of the vehicle from the GPS satellite 100, analyzes the position of the vehicle, and transmits the position information of the vehicle to the mobile communication terminal 300 so as to provide the driver with traveling information corresponding to the present position of the vehicle. In addition, in response to a request from the driver, the telematics terminal 200 offers a traveling route of the vehicle. To this end, the telematics terminal 200 may include an interface device for the driver, such as a display device and a speaker. The interface device may be integrated in the telematics terminal 200 or an external interface device can be utilized as the interface device. In FIG. 1, the telematics terminal 200 utilizes a display device and a speaker of the mobile communication terminal 300 as an external interface device thereof. That is, if the driver requests present position information and optimal route information for a destination through the mobile communication terminal 300, the telematics system provides corresponding information to the driver via the display device and the speaker of the mobile communication terminal 300.

The present invention relates to a telematics terminal and a method for transmitting route guidance data, such as images and vector data, to the driver in the telematics system. That is, the present invention relates to a telematics terminal and a method capable of transmitting route guidance data to the driver by reconstructing the route guidance data based on version information, for example, display performance information, of the mobile communication terminal, which is physically connected to the telematics terminal for an interface for the driver. At this time, version information of the mobile communication terminal includes phone models, sizes of LCDs, resolution and display options.

Figure 2:
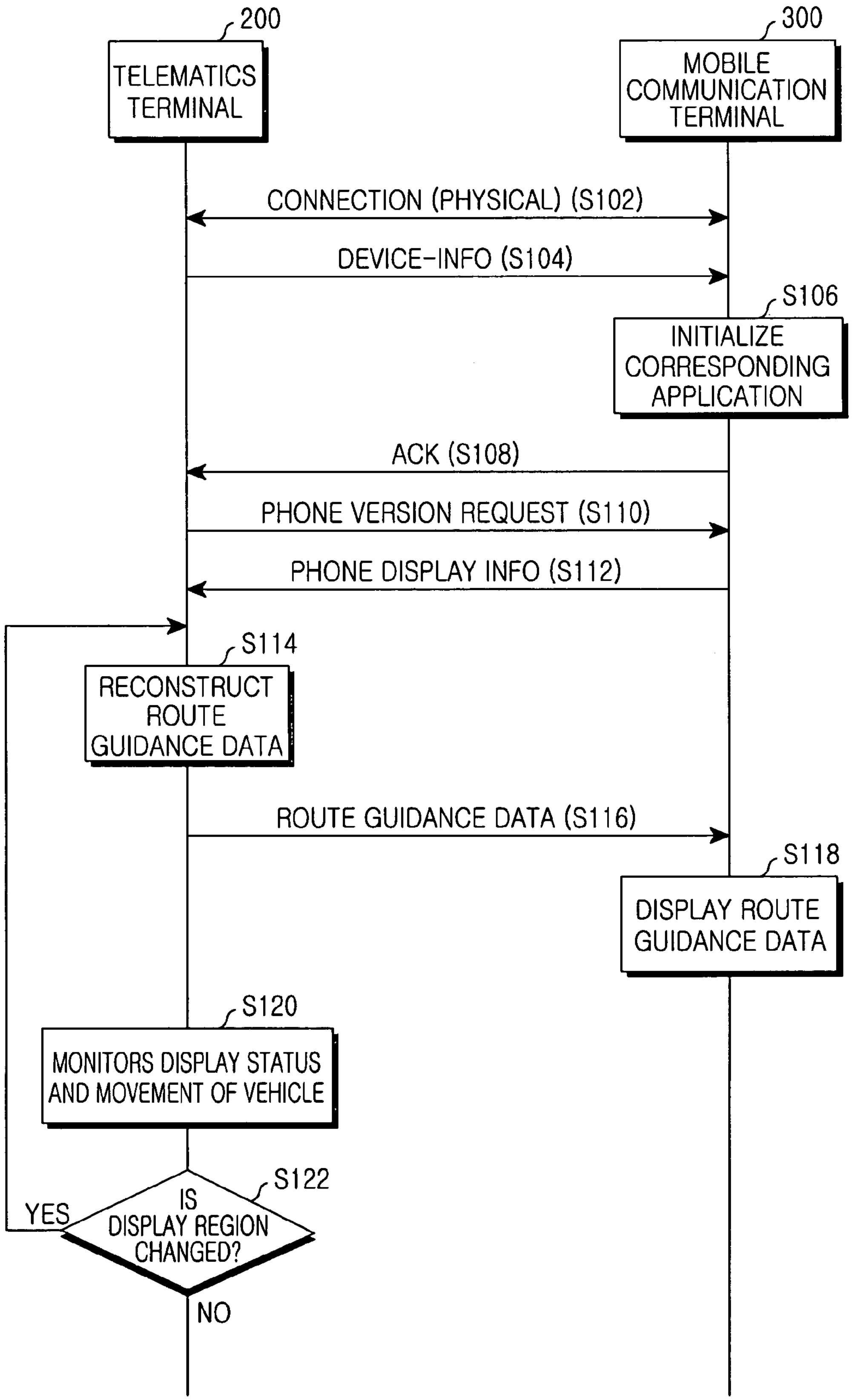
FIG. 2 is a flowchart of a procedure of transmitting optimum route guidance data from a telematics terminal to a receiving terminal according to one embodiment of the present invention.

The display options are levels of map data, which are classified according to display features. For example, if the level of map data is "1", only roads are displayed from the map data of route guidance regions. In addition, if the level of map data is "2", roads and buildings are displayed from the map data of route guidance regions, if the level of map data is "3", roads, buildings, seas, rivers, waterways are displayed from the map data of route guidance regions, and if the level of map data is "4", roads, buildings, seas, rivers, waterways, green zones, and details of complex buildings are displayed from the map data of route guidance regions, FIG. 2 a flowchart showing a method for transmitting optimum route guidance data from the telematics terminal to a receiving terminal according to one embodiment of the present invention. That is, FIG. 2 shows a procedure for transmitting optimum route guidance data from the telematics terminal 200 to the mobile communication terminal 300 shown in FIG. 1. Referring to FIG. 2, the optimum route guidance data are transmitted from the telematics terminal 200 to the mobile communication terminal 300 as follows.

First, when a physical connection is formed between the telematics terminal 200 and the mobile communication terminal 300 in step S102, in step S104, the telematics terminal 200 provides the mobile communication terminal 300 with device information of the telematics terminal 200, the device information may include, for example, a device type, an application name, an application class ID, and parameters to be transferred to an application program defined in program standards. Then, in step S106, the mobile communication terminal 300 initializes an application corresponding to received device information, and transmits a response message to the telematics terminal 200 in step S108. Here, the application corresponding to received device information means an application program in relation to the telematics terminal 200. When software initialization has been finished between the telematics terminal 200 and the mobile communication terminal 300, the telematics terminal 200 requests, in step S110, the mobile communication terminal 300 to provide a phone version, and receives phone display information from the mobile communication terminal 300 in step S112. That is, the telematics terminal 200 receives phone display information including a phone model, a size of an LCD, resolution, an image processing ability of a phone, and a display option, from the mobile communication terminal 300.

In addition, in step S114, the telematics terminal 200 reconstructs route guidance data by using phone display information of the mobile communication terminal 300, and transmits the reconstructed route guidance data to the mobile communication terminal 300 in step S116 to be displayed in step S118. That is, the telematics terminal 200 optimizes the route guidance data through data filtering, data clipping and data resizing processes and transmits the optimized route guidance data to the mobile communication terminal 300. Then, the telematics terminal 200 transmits the optimized route guidance data to the mobile communication terminal 300 through a USB interface.

In addition, the telematics terminal 200 continuously monitors a display status of the route guidance data, which has been transmitted to the mobile communication terminal 300 in step S116, and a moving status of the vehicle in a display region shown in the mobile communication terminal 300 is monitored in step S120. That is, the telematics terminal 200 tracks a movement of the vehicle in the route guidance data, such as map data, displayed in the mobile communication terminal 300. Since a method for tracking the vehicle in the map data has become well-known in the art, it will not be further described herein. In addition, if it is found in step S122 that the display region is changed through the monitoring process, the telematics terminal 200 repeats steps S114 to S120.

The telematics terminal 200 transmits the route guidance data to the mobile communication terminal 300 by reconstructing the route guidance data based on resolution of the mobile communication terminal 300 and the size of the LCD, and displays position information of the vehicle through an image in the route guidance data. In addition, if the vehicle deviates from the route guidance data shown in the mobile communication terminal 300, the telematics terminal 200 selects route guidance data fitted to a present traveling direction of the vehicle from route guidance data, which have been stored in the telematics terminal 200, and transmits the selected route guidance data to the mobile communication terminal 300. At this time, the telematics terminal 200 selects an image region to be transmitted to the mobile communication terminal 300 based on the present position and the traveling direction of the vehicle and rotates vector data corresponding to the image region in step S114. In addition, the telematics terminal 200 adjusts the size of the image based on version information and resolution of the mobile communication terminal 300 and a size of an LCD screen, and performs expansion or reduction operation for the vector data.

Figure 3:
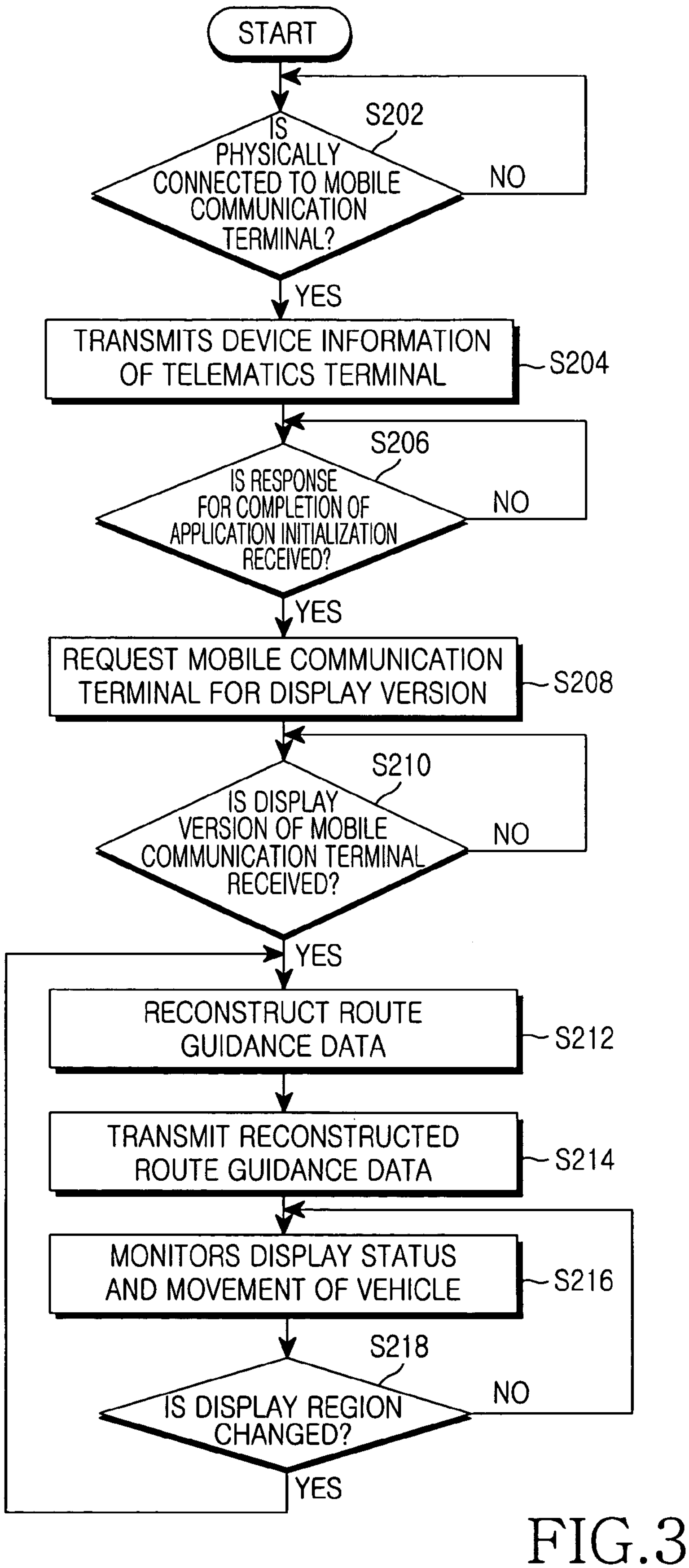
FIG. 3 is a flowchart of a procedure of transmitting route guidance data in a telematics terminal according to one embodiment of the present invention.

FIG. 3 is a flowchart showing a procedure of transmitting route guidance data in the telematics terminal according to one embodiment of the present invention. FIG. 3 shows a procedure performed in the telematics terminal 200 in detail, when route guidance images are transmitted to the mobile communication terminal 300 from the telematics terminal 200. Referring to FIG. 3, the telematics terminal according to one embodiment of the present invention transmits route guidance data as follows.

When in step S202, the telematics terminal detects a physical connection with respect to the mobile communication terminal, in step S204, the telematics terminal provides the mobile communication terminal with device information of the telematics terminal, for example, a device type, an application name, an application class ID, and parameters to be transferred to an application program defined in standards. Then, after receiving an application initialization completion signal from the mobile communication terminal in step S206, the telematics terminal requests a display version to the mobile communication terminal in step S208. The telematics terminal receives an initialization completion signal for an application program, which is included in device information transmitted from the telematics terminal, from the mobile communication terminal.

In addition, the telematics terminal request display version information to the mobile communication terminal in step S208. The telematics terminal requests phone display information, such as a phone model, a size of an LCD, resolution, an image processing ability of a phone, and a display option, to the mobile communication terminal.

Upon determining in step S210 that display version information from the mobile communication terminal was received in response to the request of the telematics terminal, in step S212 the telematics terminal reconstructs route guidance data based on display version information of the mobile communication terminal, and transmits the reconstructed route guidance data to the mobile communication terminal in step S214. The telematics terminal optimizes the route guidance data such that the route guidance data are fitted to display performance of the mobile communication terminal and transmits the optimized route guidance data to the mobile communication terminal through a USB interface.

In addition, the telematics terminal continuously monitors a display status of the route guidance data in the mobile communication terminal 300, and a moving status of the vehicle in the route guidance data shown in the mobile communication terminal in step S216. If in step S218 it is determined that a display region in the mobile communication terminal is changed, the telematics terminal repeats steps S212 to S216. The telematics terminal tracks a movement of the vehicle in the route guidance data displayed in the mobile communication terminal 300. Since a method for tracking the vehicle in the route guidance data has become well-known in the art, it will not be further described herein. When it is found that the display region is changed through the tracking process, the telematics terminal repeats steps S212 to S216. The method for reconstructing the route guidance data in step S212 is identical to the method for reconstructing the route guidance data described in step S114.

Figure 4:
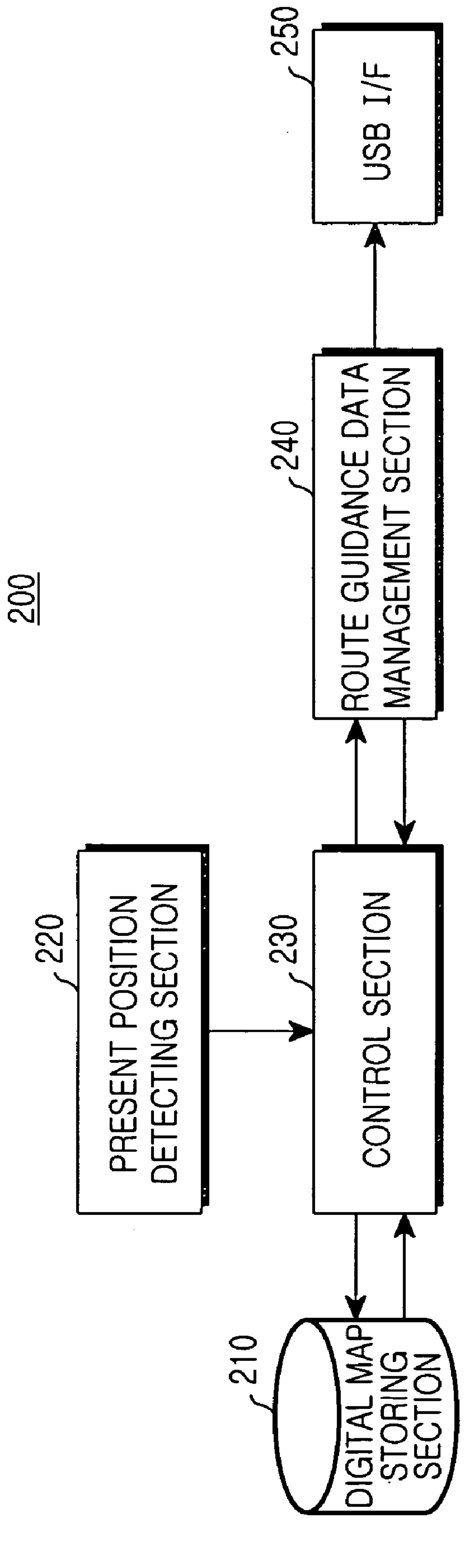
FIG. 4 is a block diagram of a structure of a telematics terminal according to one embodiment of the present invention.

FIG. 4 is a block view showing a structure of the telematics terminal 200 according to one embodiment of the present invention. Referring to FIG. 4, the telematics terminal 200 includes a digital map storing section 210, a present position detecting section 220, a control section 230, a route guidance data management section 240 and a USB interface section 250. The digital map storing section 210 stores map data in order to provide a user with a present position and a traveling direction of a vehicle at the user's request. Particularly, the digital map storing section 210 classifies map data into predetermined levels.

Figure 5A:
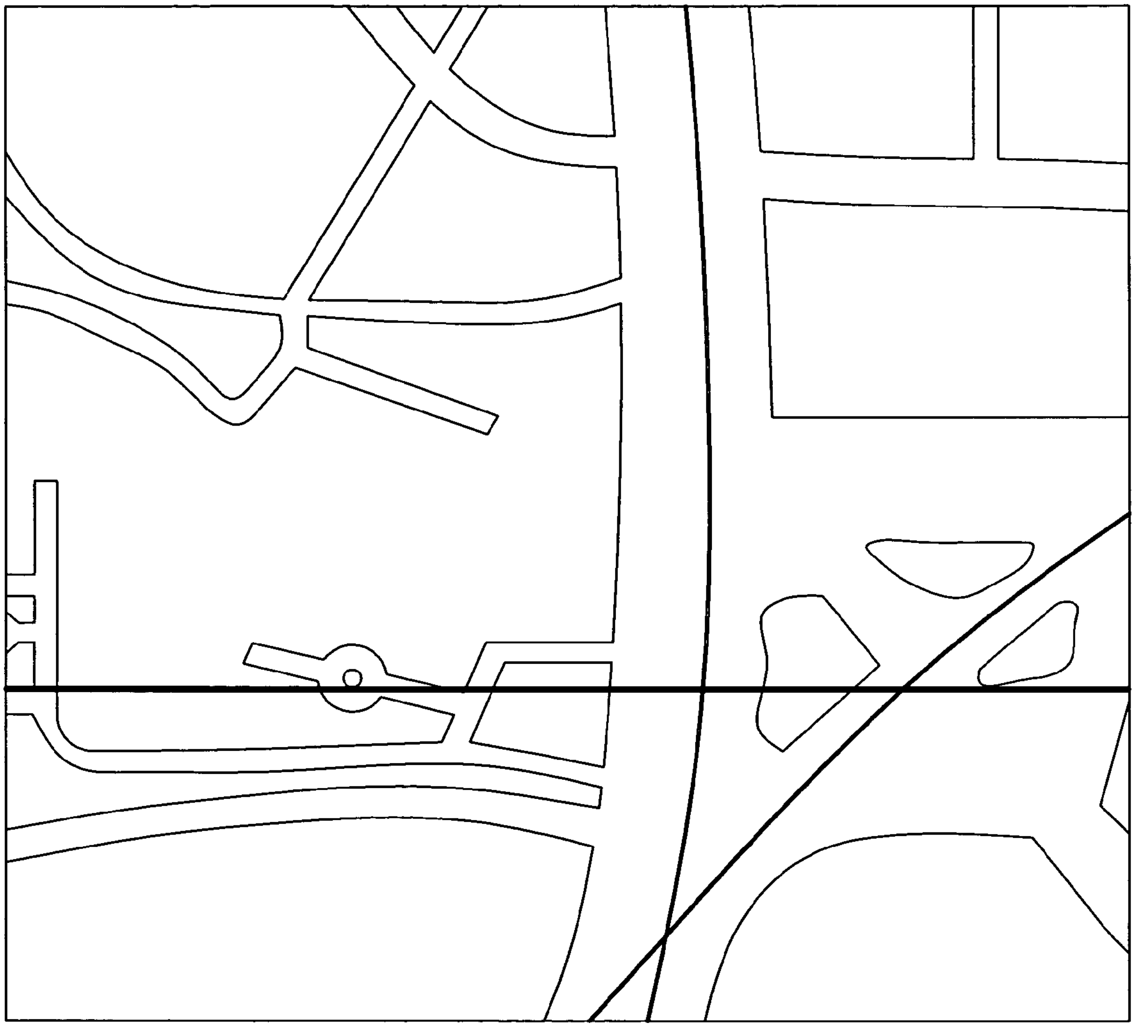
FIGS. 5*a*-5*e* are exemplary diagrams of map data stored in a telematics terminal according to one embodiment of the present invention.
Figure 5B:
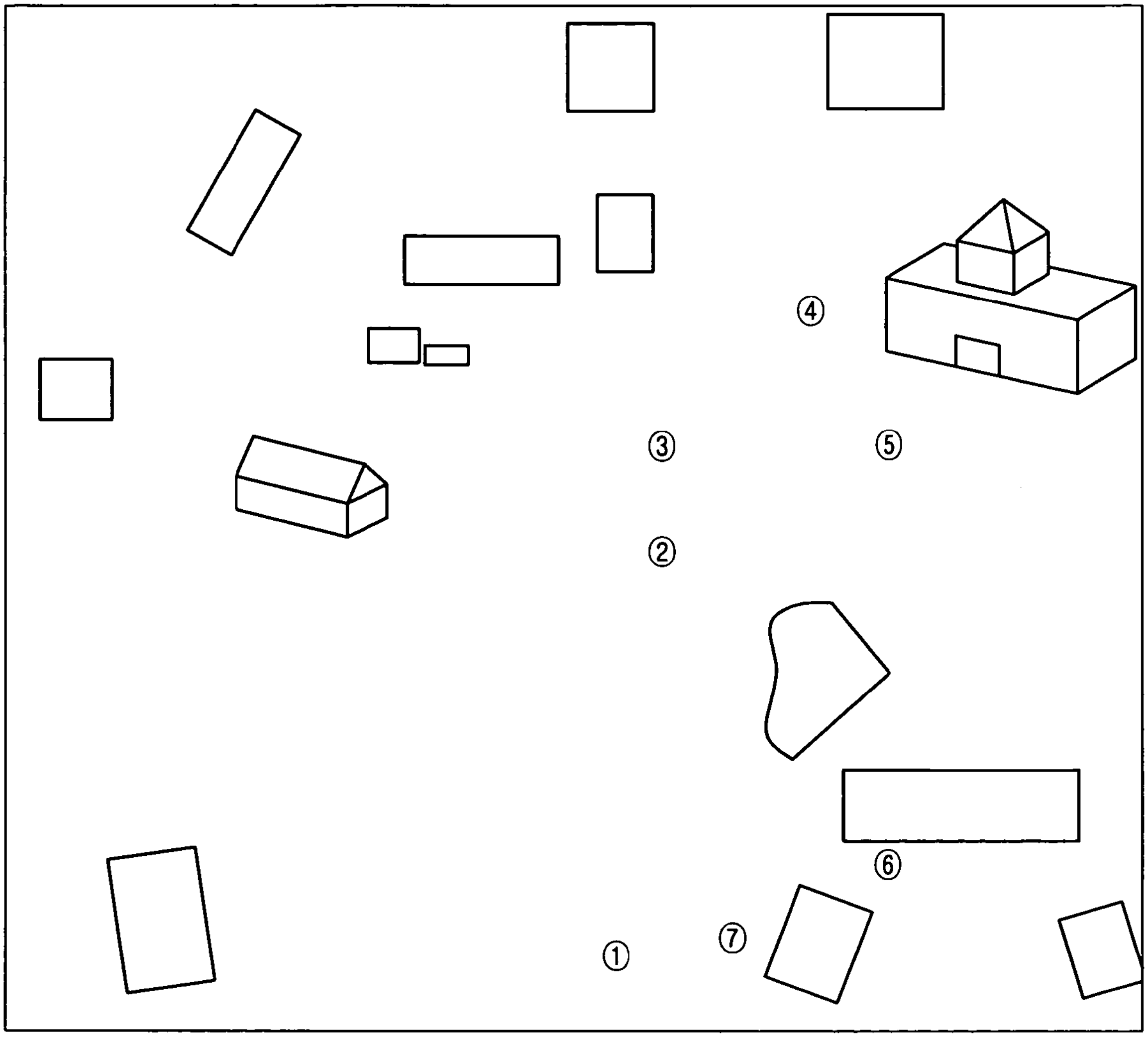
Figure 5C:
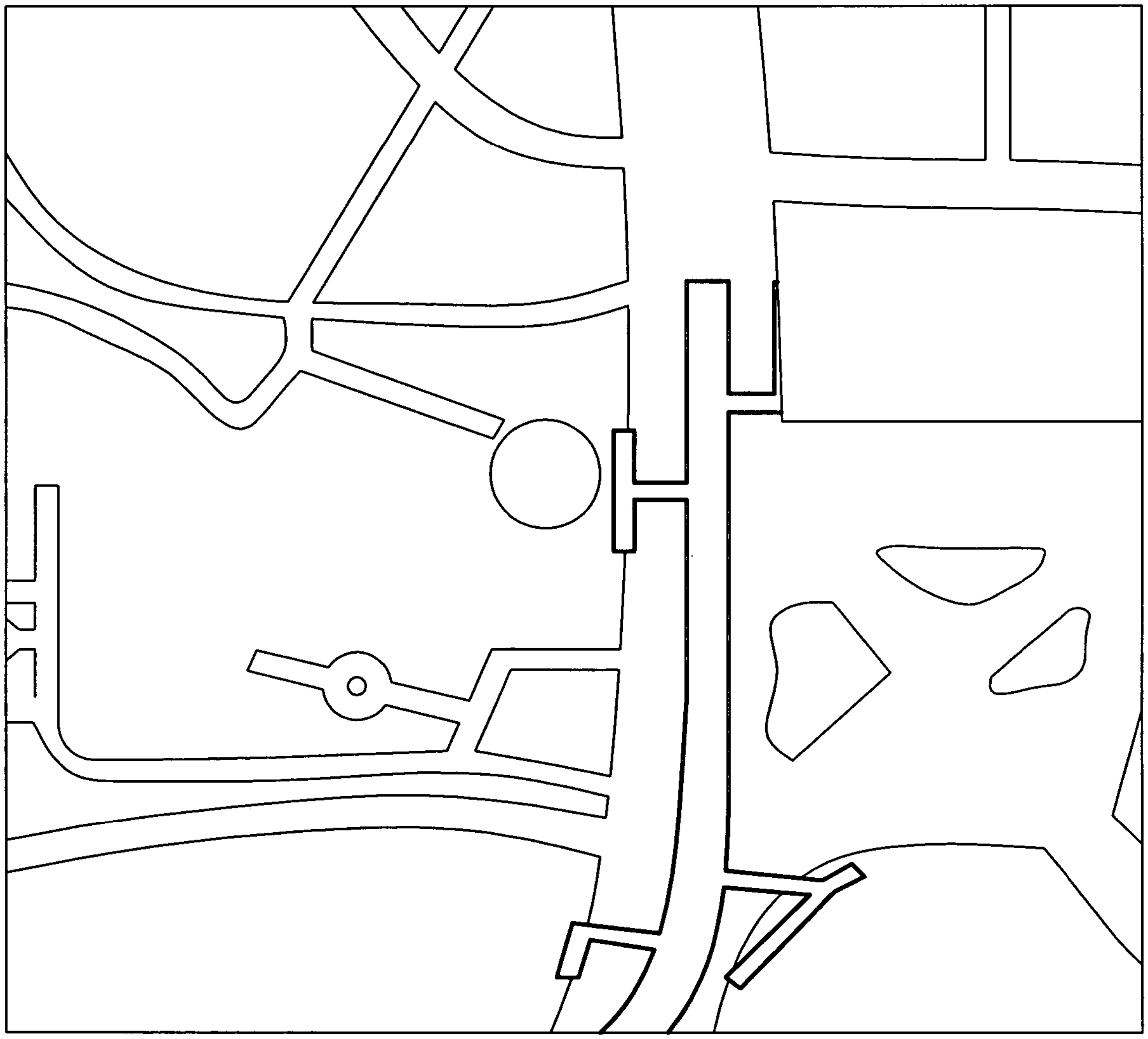
Figure 5D:
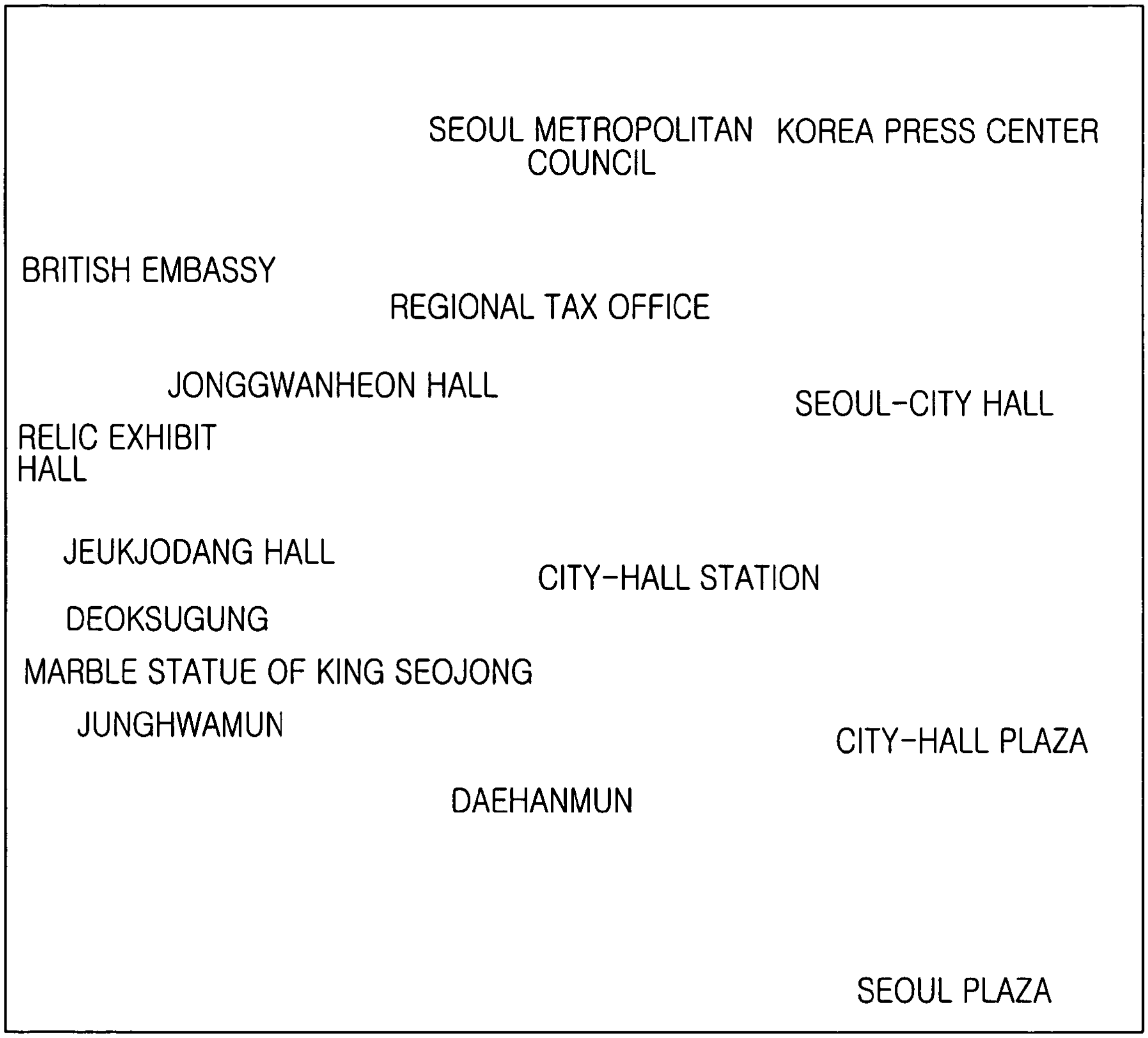
Figure 5E:
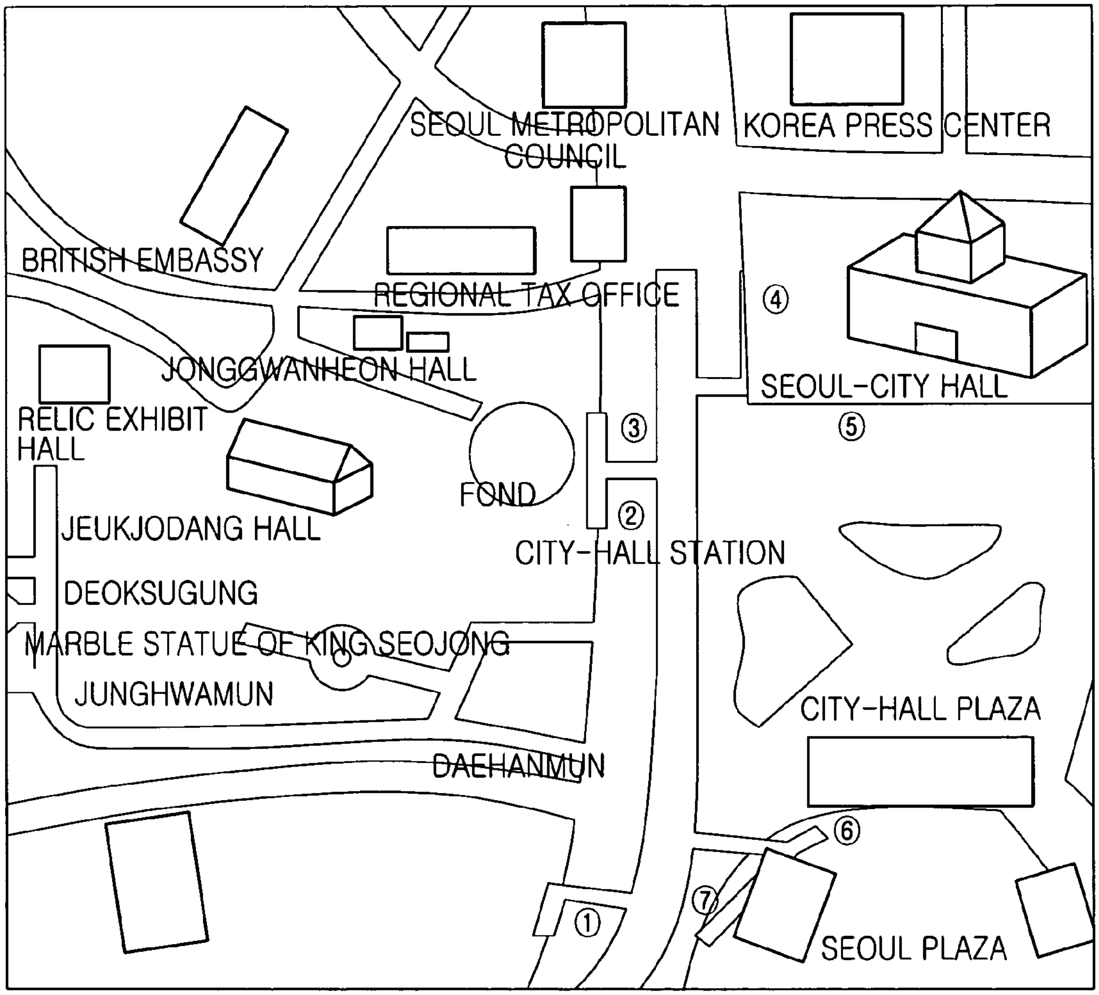

FIGS. 5*a*-5*e* are views showing examples of map data stored in the digital map storing section 210 according to one embodiment of the present invention. FIG. 5*a* shows map data representing road information of a predetermined region, FIG. 5*b* shows map data representing building information of the predetermined region, FIG. 5*c* shows map data representing park and green zone information of the predetermined region, FIG. 5*d* shows map data representing labels, for example, name of buildings and roads about geographic information of the predetermined region, and FIG. 5*e* shows map data representing road, building, park, and green zone information and labels. That is, the digital map storing section 210 stores map data by classifying map data into several levels as shown in FIGS. 5*a* to 5*d*.

The telematics terminal may transmit map data to the mobile communication terminals depending on display performance of corresponding mobile communication terminals. For example, if the mobile communication terminal has inferior image processing ability, route guidance data are formed based on map data including only basic road information, and if the mobile communication terminal has superior image processing ability, route guidance data are formed based on map data including all information as shown in FIG. 5*e*. Preferably, such a formation level of the route guidance data is established in the mobile communication terminal as a display option.

The present position detecting section 220 detects and outputs the present position of the vehicle. The control section 230 calculates an optimum route for a predetermined route by using map data stored in the digital map storing section 210 when the user requests route guidance data for the predetermined route and creates the route guidance data (for example, a map) for providing the user with the optimum route. In addition, the control section 230 displays the present position of the vehicle outputted from the present position detecting section 220 in the route guidance data.

The route guidance data management section 240 reconstructs route guidance data to be transferred to the mobile communication terminal 300 based on display version information, for example, phone display information including a phone model, a size of an LCD, resolution, an image processing ability of a phone, and a display option, of the mobile communication terminal 300. That is, the route guidance data management section 240 reconstructs route guidance data fitted to display performance of the corresponding mobile communication terminal 300. To this end, the route guidance data management section 240 receives information about the present position and the traveling direction of the vehicle through the control section 230 and determines a position of the vehicle in the route guidance data provided in the mobile communication terminal 300. In addition, the route guidance data management section 240 selects an image region to be transferred to the mobile communication terminal 300 from images created by the control section 230 based on position information and traveling direction information of the vehicle in the route guide data and rotates vector data corresponding to the selected image region. Furthermore, the route guidance data management section 240 adjusts a size of the image based on version information of the mobile communication terminal, size information of an LCD screen and resolution of the mobile communication terminal, and performs expansion or reduction operation for the vector data.

The USB interface section 250 transmits the optimum route guidance data from the route guidance data management section 240 to the mobile communication terminal 300.

Figure 6:
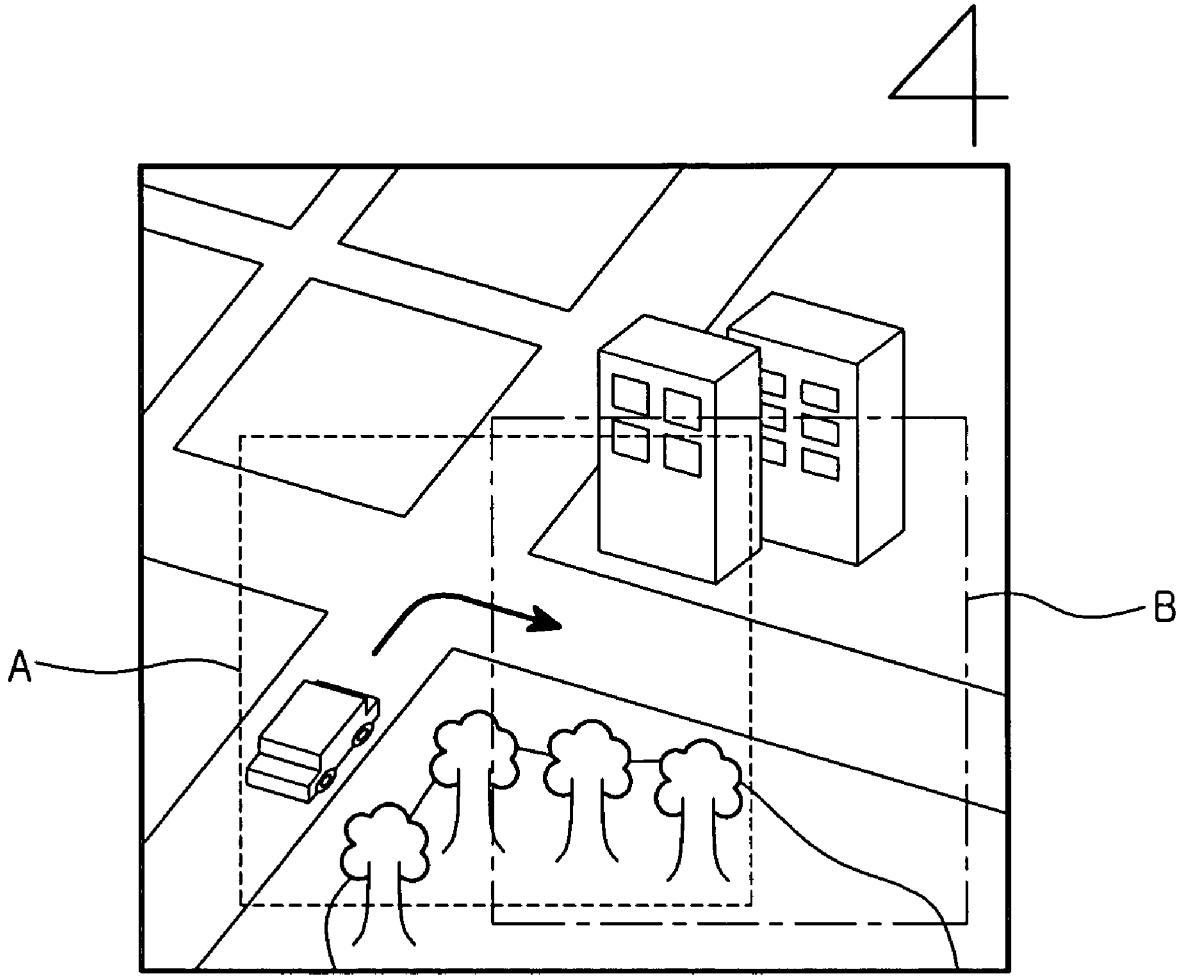
FIG. 6 is an exemplary diagram of images provided to a user from a telematics terminal according to one embodiment of the present invention.

FIG. 6 is a view showing an example of images provided to a user from the telematics terminal according to one embodiment of the present invention. That is, FIG. 6 shows an image created from the telematics terminal for route guidance. In FIG. 6, an "A" region and a "B" region represent regions displayed in the LCD of the mobile communication terminal according to a movement of the vehicle. Generally, the image created from the telematics terminal has a size of 176×131. Accordingly, if a whole area shown in FIG. 6 has a size of 176×131, the "A" region and the "B" region represent a size of the LCD.

Figure 7A:
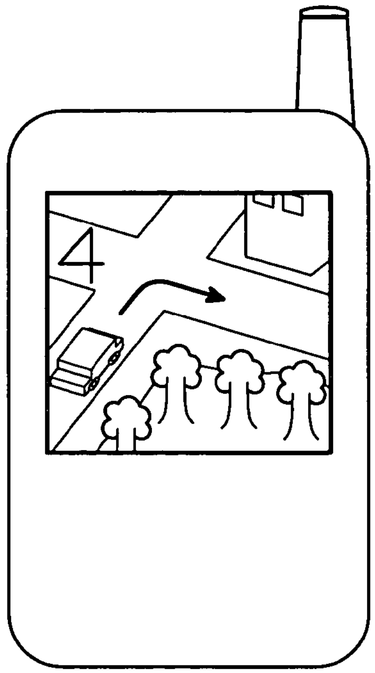
FIGS. 7*a* and 7*b* are diagrams of images being displayed in a mobile communication terminal in accordance with a movement of a vehicle according to one embodiment of the present invention.
Figure 7B:
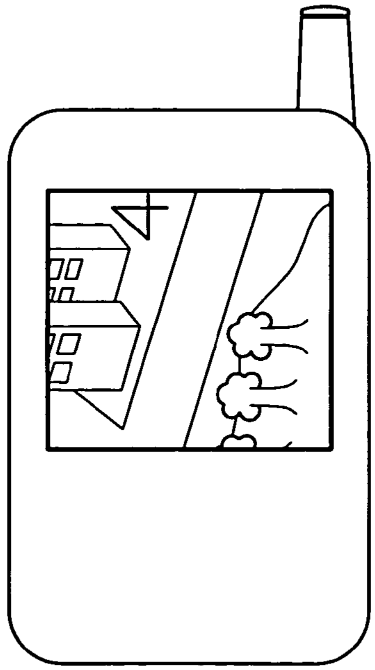

FIGS. 7*a* and 7*b* are views showing images displayed in the mobile communication terminal according to the movement of the vehicle. FIG. 7*a* shows the "A" region shown in FIG. 6, and FIG. 7*b* shows the "B" region shown in FIG. 6. Referring to FIGS. 7*a* and 7*b*, a direction of the image shown in FIG. 7*b* has been changed from a direction of the image shown In FIG. 7*a*. That is, the direction of the image may be changed in view of the traveling direction of the vehicle for user's convenience. The telematics terminal reconstructs the route guidance data such that the route guidance data are displayed in the mobile communication terminal matching the display performance of the mobile communication terminal. At the same time, the telematics terminal transmits the route guidance data to the mobile communication terminal by rotating the image according to the traveling direction of the vehicle. To this end, the telematics terminal selects the display region from the route guidance data according to the traveling direction of the vehicle and transmits the route guidance data including the selected display region to the mobile communication terminal by reconstructing the route guidance data according to the display performance of the mobile communication terminal.

Figure 8A:
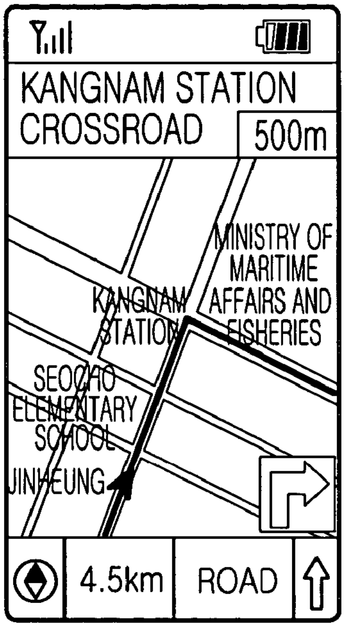
FIGS. 8*a* and 8*b* are exemplary diagrams of route guidance data embodied as images and vector data according to one embodiment of the present invention.
Figure 8B:
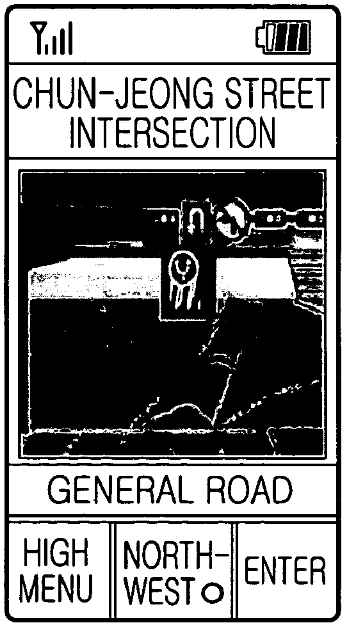

FIGS. 8*a* and 8*b* are views showing examples of route guidance data embodied as images and vector data. FIG. 8*a* is route guidance data of a "Kangnam station crossroad" embodied by vector data, and FIG. 8*b* is route guidance data of a "Chungjeongno three-way junction" embodied by image data. As described above, in accordance -with the present invention, the telematics terminal recognizes performance information of the mobile communication terminal, which is cooperated with the telematics terminal for providing the user with telematics services, and transmits route guidance data (for example, image data) to the mobile communication terminal by reconstructing the route guidance data such that the route guidance data are fitted to performance of the mobile communication terminal. Accordingly, the telematics terminal of the present invention may be adaptable for various kinds of mobile communication terminals. Therefore, the users can use the telematics services without exchanging the mobile communication terminal.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting route guidance data from a telematics terminal including images and vector data to a receiving terminal, the method comprising the steps of:

(i) initializing operational conditions of a mobile communication terminal by transmitting device information of the telematics terminal to the mobile communication terminal when a connection between the telematics terminal and the mobile communication terminal is detected;

(ii) receiving display performance information from the mobile communication terminal;

(iii) creating route guidance data for telematics services to be transferred to the mobile communication terminal;

(iv) selecting a route guidance region to be transferred to the mobile communication terminal from route guidance data created in step (iii) and reconstructing route guidance data for the selected route guidance region based on the display performance information of the mobile communication terminal received in step (ii); and (v) transmitting the route guidance data reconstructed in step (iv) to the mobile communication terminal.

2. The method as claimed in claim 1, further comprising the steps of:

monitoring position movement information of a vehicle in the route guidance data displayed in the mobile communication terminal; and repeating steps (iv) and (v) when a position of the vehicle deviates from a route guidance data area displayed in the mobile communication terminal.

3. The method as claimed in claim 1, wherein data communication is carried out between the telematics terminal and the mobile communication terminal through a universal serial bus interface.

4. The method as claimed in claim 1, wherein in step (i), the mobile communication terminal receiving the device information of the telematics terminal initializes an application corresponding to the device information and transmits a response message thereof to the telematics terminal.

5. The method as claimed in claim 1, wherein, in step (ii), the display performance information includes version information of the mobile communication terminal, a size of a liquid crystal display, resolution, and display option information.

6. The method as claimed in claim 5, wherein step (iv) further includes the steps of:

a) selecting an image region to be transferred to the mobile communication terminal from images included in the route guidance data created in step (iii) based on position information and traveling direction information of a vehicle;

c) adjusting the images based on the version information and resolution of the mobile communication terminal and the size of the liquid crystal display; and d) performing an expansion or reduction operation for the vector data.

7. A telematics terminal comprising:

a digital map storing section for storing map data therein;

a present position detecting section for detecting and outputting a present position of a vehicle;

a control section for calculating an optimum route in response a route guidance request and creating route guidance data including images and vector data for the optimum route;

a route guidance data management section for receiving and storing display performance information of a mobile communication terminal, to which the route guidance data are transmitted, and reconstructing the route guidance data created in the control section such that the route guidance data are corresponding to the display performance information of the mobile communication terminal; and an interface section for transmitting optimized route guidance data from the route guidance data management section to the mobile communication terminal through a universal serial bus interface.

8. The telematics terminal as claimed in claim 7, wherein the digital map storing section stores the map data therein by classifying the map data into several levels according to display features of the map data.

9. The telematics terminal as claimed in claim 7, wherein the route guidance data management section stores information including version information of the mobile communication terminal, which is physically connected to the telematics terminal, size information of a liquid crystal display screen, resolution, and display option information.

10. The telematics terminal as claimed in claim 7, wherein the route guidance data management section determines a position of the vehicle in the route guidance data provided in the mobile communication terminal by receiving position information and traveling information of the vehicle through the control section, selects an image region to be transferred to the mobile communication terminal from images created by the control section based on the position information and traveling information of the vehicle, rotates the vector data corresponding to the image region, adjusts the images based on version information of the mobile communication terminal, resolution, and a size of a liquid crystal display, and performs an expansion or reduction operation for the vector data.

* * * * *